United States Patent
Feuerecker et al.

[19]

[11] Patent Number: 6,112,543
[45] Date of Patent: Sep. 5, 2000

[54] DEVICE FOR COOLING AN INTERIOR COMPARTMENT OF A MOTOR VEHICLE

[75] Inventors: Guenther Feuerecker, Stuttgart; Ulrich Salzer, Renningen; Markus Schmid, Wernau, all of Germany

[73] Assignee: Behr GmbH & Co., Stuttgart, Germany

[21] Appl. No.: 09/379,783

[22] Filed: Aug. 24, 1999

[30] Foreign Application Priority Data

Aug. 27, 1998 [DE] Germany .................. 198 38 880

[51] Int. Cl.⁷ .................................................. F25D 11/00
[52] U.S. Cl. ........................... 62/430; 62/99; 62/201; 62/430
[58] Field of Search ............................. 62/435, 430, 99, 62/201

[56] References Cited

U.S. PATENT DOCUMENTS

| | | | |
|---|---|---|---|
| 4,761,967 | 8/1988 | Sumikawa et al. | 62/201 |
| 5,054,540 | 10/1991 | Carr | 62/430 |
| 5,277,038 | 1/1994 | Carr | 62/430 X |
| 5,355,688 | 10/1994 | Rafalovich et al. | 62/430 X |
| 5,381,671 | 1/1995 | Saito et al. | 62/430 |
| 5,483,807 | 1/1996 | Abersfelder et al. | 62/435 |
| 5,778,683 | 7/1998 | Drees et al. | 62/201 X |

FOREIGN PATENT DOCUMENTS

| | | |
|---|---|---|
| 43 27 866 | 9/1994 | Germany . |
| 195 24 660 | 10/1996 | Germany . |
| 196 29 114 | 1/1998 | Germany . |

*Primary Examiner*—Henry Bennett
*Assistant Examiner*—Chen-Wen Jiang
*Attorney, Agent, or Firm*—Foley & Lardner

[57] ABSTRACT

A cooling device for a motor vehicle has a secondary circuit for transferring cold generated in an evaporator of a primary cooling circuit of a cooling unit, by means of a coolant, to at least one cold accumulator and/or to at least one heat exchanger for cooling the air fed to a vehicle interior. The secondary circuit has a control and distribution unit that feeds a first fraction of coolant flow, the level of which can be adjusted, to the cold accumulator, and a second fraction of coolant flow, the level of which can also be adjusted, to the heat exchanger. The cooling device allows optimum use of the cold accumulator during standard air-conditioning or in the peak load range, improves passenger comfort in the vehicle, and prevents frosting of the heat exchanger.

8 Claims, 11 Drawing Sheets

DEVICE FOR COOLING AN INTERIOR COMPARTMENT OF A MOTOR VEHICLE

FIELD OF THE INVENTION

The invention relates to a device for cooling an interior compartment of a motor vehicle.

BACKGROUND OF THE INVENTION

A device for cooling an interior compartment is known from DE 43 27 866. This device has a primary cooling circuit, which comprises a compressor, a condenser, an expansion unit, and an evaporator. The evaporator is designed as a liquid/liquid heat exchanger and transfers the cold, which is generated in the primary circuit of the evaporator, to coolant of a secondary circuit. The secondary circuit includes a cold accumulator and a heat exchanger, which is used to cool the air to be supplied to a vehicle interior. The cold accumulator is arranged in series with the heat exchanger in the secondary circuit and can be bridged via a bypass.

A significant drawback of this known device for cooling an interior compartment is that, when the accumulator is being charged, the cold-transporting agent always has to flow through the heat exchanger, even when the heat exchanger is not being used, for example, because there is no need for cooling. Consequently, as the accumulator charges, the heat exchanger will become frosted, or, at the very least, condensation water will precipitate on the heat exchanger, resulting in unpleasant odors due to the presence of bacteria. The heat exchanger is usually subjected to forced flow of air, with the result that there is a constant loss of cooling capacity. A further drawback is that the cold generated in the evaporator of the primary circuit cannot be distributed as desired to the heat exchanger and the cold accumulator.

DE 196 29 114 discloses a device for cooling an interior compartment of a motor vehicle. This device also has a cold-generating primary circuit. The cold-generating circuit has an evaporator, by means of which the cold is transferred into a secondary circuit. The secondary circuit has a valve unit, by means of which the generated cold can optionally be transferred to one or two heat exchangers in order to cool the air which is to be supplied to a vehicle interior. The coolant used in the secondary circuit is a water/Glysantin mixture. A drawback of this known air-conditioning unit is that there is no cold accumulator, so that there is no standard air-conditioning or there is insufficient cooling capacity in the peak requirement range.

The difficulties suggested in the preceding are not intended to be exhaustive but rather are among many which tend to reduce the effectiveness of known cooling devices. Other noteworthy problems may also exist; however, those presented above should be sufficient to demonstrate that such devices appearing in the past will admit to worthwhile improvement.

SUMMARY OF THE INVENTION

The present invention relates to a device for cooling an interior compartment of a motor vehicle. The cooling device generally includes a cold accumulator, a heat exchanger, a primary cooling circuit having an evaporator, and a secondary circuit that transfers, via coolant, cold generated in the evaporator of the primary cooling circuit to the cold accumulator and the heat exchanger to cool the air fed to a vehicle interior. The heat exchanger preferably forms part of an air-conditioning unit of the motor vehicle. The secondary circuit feeds a first fraction of coolant flow to the cold accumulator and a second fraction of coolant flow to the heat exchanger. The first and second fractions are selectively adjustable. The cooling device also may include a bypass in parallel with the evaporator.

According to the invention, cold generated in the primary cooling circuit can be optimally distributed, via the secondary circuit, to individual consumer units, such as the cold accumulator and the heat exchanger. The cooling device allows optimal use of the cold accumulator for standard air-conditioning or in the peak load range and thus can improve passenger comfort in the vehicle. The cooling device can also minimize or alleviate the above-mentioned drawbacks of known devices, such as, for example, frosting of the heat exchanger.

The secondary circuit may include a control and distribution unit having a principal circuit and a circulation pump that conveys coolant in the principal circuit. The secondary circuit also may include an accumulator auxiliary circuit that selectively communicates coolant to and from the control and distribution unit in accordance with the first fraction. The accumulator auxiliary circuit may comprise the cold accumulator and coolant lines, connected to the cold accumulator, through which the first fraction of the coolant flow may flow to charge and discharge the cold accumulator. Further, the secondary circuit may include a heat exchanger auxiliary circuit that selectively communicates coolant to and from the control and distribution unit in accordance with the second fraction. The heat exchanger auxiliary circuit may comprise the heat exchanger and coolant lines, connected to the heat exchanger, through which the second fraction of the coolant flow may flow to act on the heat exchanger.

The cooling device may also include a second circulation pump, fluidly communicating with a coolant line of the heat exchanger auxiliary circuit. The circulation pump preferably is adapted to maintain a minimum mass flow rate of the coolant in the heat exchanger auxiliary circuit. The minimum mass flow rate is independent of the coolant flow of the principal circuit. The control and distribution unit may disconnected from the accumulator auxiliary circuit and/or the heat exchanger auxiliary circuit.

The control and distribution unit preferably includes a plurality of four-way valves to control the selective fluid communication between the accumulator auxiliary circuit and the control and distribution unit and between the heat exchanger auxiliary circuit and the control and distribution unit. One of the four-way valves includes an inlet port to and an outlet port from the accumulator auxiliary circuit. Another of the four-way valves includes an inlet port to and an outlet port from the heat exchanger auxiliary circuit.

In another aspect of the present cooling device, the cooling device may include a second heat exchanger that selectively exchanges coolant with at least one of the principal circuit, the accumulator auxiliary circuit, and the heat exchanger auxiliary circuit via a four-way valve. In addition, the cooling device may include a second cold accumulator that selectively exchanges coolant with at least one of the principal circuit, the accumulator auxiliary circuit, and the heat exchanger auxiliary circuit via a four-way valve.

BRIEF DESCRIPTION OF THE DRAWINGS

The invention is explained in more detail below on the basis of exemplary embodiments and with reference to the drawings, in which.

DETAILED DESCRIPTION OF THE PREFERRED EMBODIMENTS

A device 10 according to the invention for cooling an interior compartment of a motor vehicle has a cooling unit 12 that contains a primary cooling circuit 14. The primary cooling circuit 14 generally comprises a condensor 20, a compressor 18 that is connected via refrigerant lines 16 to the condenser 20, an expansion unit 22 and an evaporator 24. A refrigerant dryer and a refrigerant collector may be provided in the primary cooling circuit 12 in a known way.

The evaporator 24 is designed as a refrigerant/liquid heat exchanger and can be acted on, on the one hand, by the refrigerant of the primary cooling circuit 14 and, on the other hand, by coolant that circulates in a secondary circuit 26, so that cold generated in the evaporator 24 can be transferred to the coolant of the secondary circuit 26.

The coolant may be any suitable coolant; however, it is preferable to use a water/Glysantin mixture. A circulation pump 28 ensures that the coolant circulates within the secondary circuit 26.

The secondary circuit 26 has a control and distribution unit 30, by means of which a first fraction of the coolant flow, the level of which can be adjusted via a four-way valve, can be fed to a cold accumulator 32 and a second fraction of the coolant flow, the level of which can likewise be adjusted by another four-way valve, can be fed to a heat exchanger 34.

The cold accumulator 32 can be charged with cold via the secondary circuit 26, and the accumulated cold, as described in more detail below, can be fed back into the secondary circuit 26. The heat exchanger 34 is used to cool air, which can be fed to a vehicle interior to air condition the interior compartment of the vehicle. The conditioned air is indicated by an arrow 37. A housing for air guidance, as well as further details of the air guidance and air conveying system, for example the air-guidance housing, blower, air flaps and the like, are not shown for the sake of clarity. The heat exchanger 34 may be part of an air-conditioning unit which is arranged, for example, in a dashboard of the motor vehicle, where it replaces the evaporator which is otherwise customary.

In a first exemplary embodiment, illustrated in FIGS. 1 to 6, the secondary circuit 26 comprises a control and distribution unit 30 that includes a principal circuit 36, an accumulator auxiliary circuit 38 and a heat exchanger auxiliary circuit 40. The principal circuit 36 is made up of coolant lines 42, 44, 46, 48 and 50, line 50 containing the circulation pump 28. In this exemplary embodiment, the control and distribution unit 30 essentially comprises four-way valves 52, 54, 56, and the circulation pump 28 and corresponding coolant lines 44, 46, 48 of the principal circuit 36. The individual lines 42 to 50 of the principal circuit 36 are connected to one another via the four-way valves 52, 54 and 56, the function and operation of which are described below.

Figure 1:
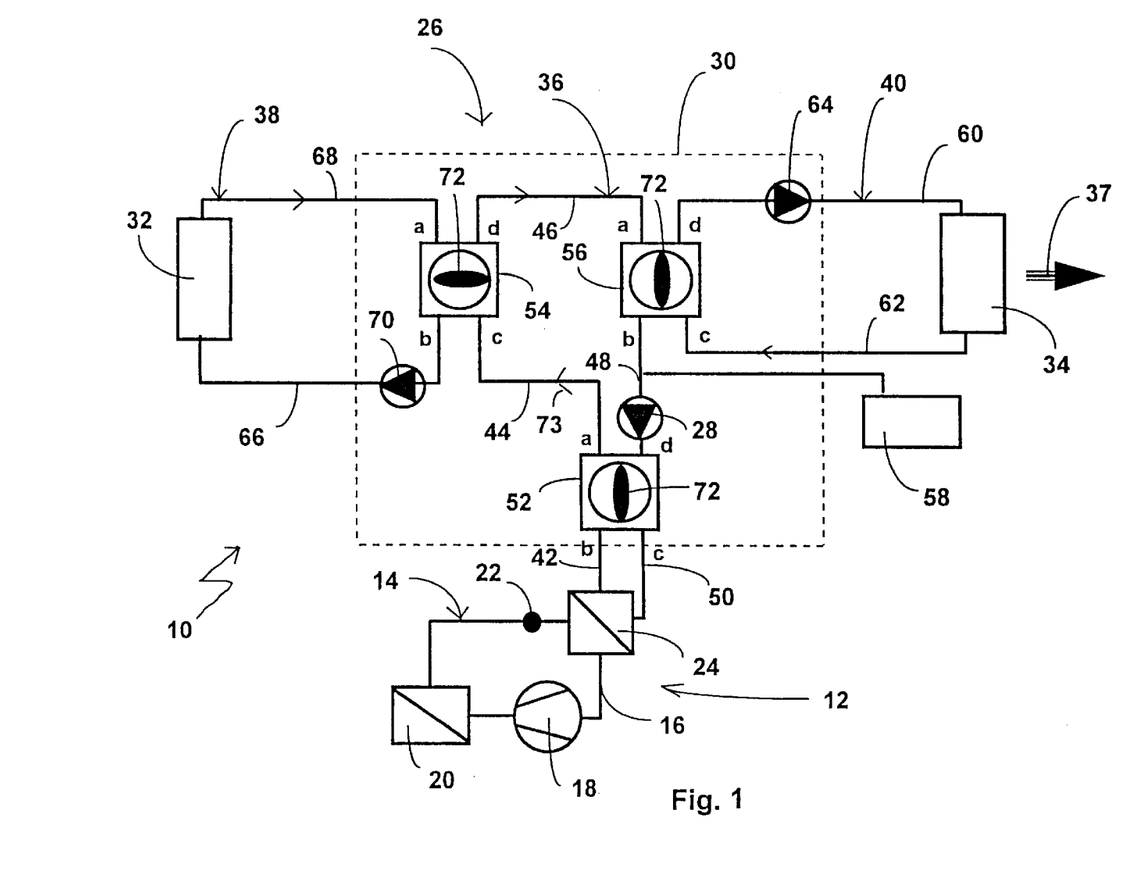
FIGS. 1–6 show diagrammatic illustrations of a first exemplary embodiment of a device according to the invention for cooling an interior compartment of a motor vehicle, the individual figures illustrating different operating states of the invention.

A compensation container 58 is provided, so that there is always sufficient coolant in the secondary circuit 26 and so that it is possible to compensate for volume changes when the coolant is heated or cooled. Different connection points for the compensation container 58 from that illustrated in FIG. 1 are also possible.

The heat exchanger auxiliary circuit 40 can be connected to and disconnected from the principal circuit 36 via the four-way valve 56. The heat exchanger auxiliary circuit 40 comprises a coolant line 60, the heat exchanger 34, and a coolant line 62. The coolant line 60 contains a second circulation pump 64 that pumps coolant located in the heat exchanger auxiliary circuit 40 around the heat exchanger auxiliary circuit 40 at a defined mass flow rate.

The accumulator auxiliary circuit 38 can be connected to and disconnected from the principal circuit 36 in the same way via the four-way valve 54. This circuit 38 comprises a coolant line 66, the cold accumulator 32, and a coolant line 68. The coolant line 66 optionally, but not necessarily, has a third circulation pump 70, by means of which it is possible to maintain a specific mass flow rate in the accumulator auxiliary circuit 38.

By adjusting the four-way valves 52, 54 and 56, it is possible to implement various operating modes of the cooling device according to the invention. Each of the four-way valves 52, 54 and 56 has a rotary slide 72, as a function of whose angular position four ports a, b, c and d of each four-way valve are connected to one another in a suitable, preferably continuously variable manner.

FIG. 1 shows a first operating mode, in which the cold accumulator 32 is being charged with full capacity. To this end, the coolant is cooled to its maximum extent in the evaporator 24 and passes through the following components, in the direction of arrow 73, as prescribed by the circulation pump 28: line 42—four-way valve 52, via ports b and a—line 44—four-way valve 54, via ports c and b—line 66—cold accumulator 32, which is thus cooled and accumulates the cold—line 68—four-way valve 54, via the ports a and d—line 46—four-way valve 56, via the ports a and b—line 48—circulation pump 28—four-way valve 52, via the ports d and c, and, finally, through the line 50 and back into the evaporator 24. In this case, the accumulator auxiliary circuit 38 is fully connected to the principal circuit 36 via the four-way valve 54, so that the entire coolant flow also passes through the accumulator auxiliary circuit 38. The heat exchanger auxiliary circuit 40 is fully disconnected from the principal circuit 36 by the four-way valve 56 and is therefore out of operation. In this operating mode, the coolant must be at a temperature of less than 0° C., which is necessary in order to charge the cold accumulator 32 with cold, since the fact that the heat exchanger auxiliary circuit 40 is disconnected means that there is no possibility of frosting of the heat exchanger 34.

Figure 2:
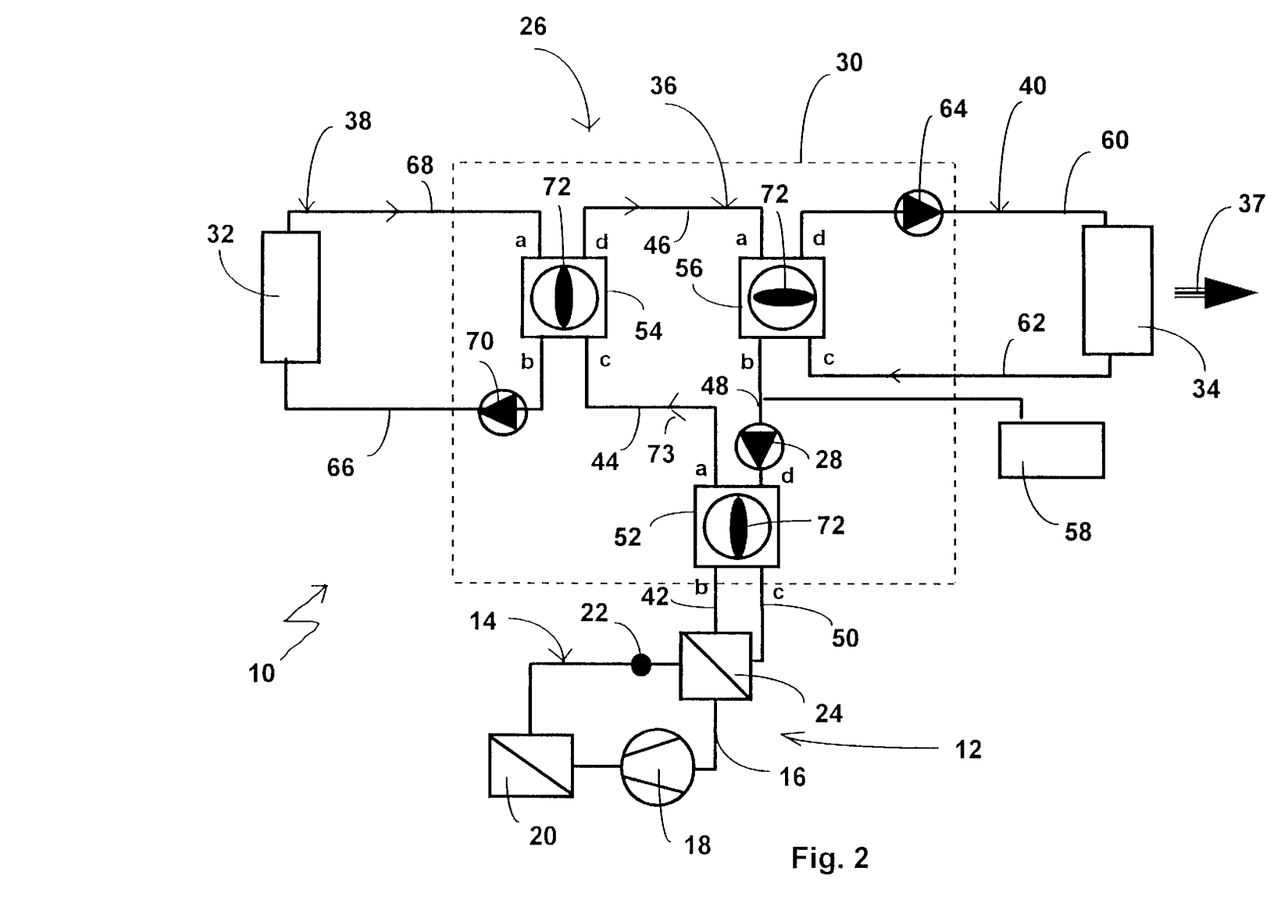

FIG. 2 shows an operating mode in which the accumulator auxiliary circuit 38 is disconnected and the heat exchanger auxiliary circuit 40 is fully connected to the principal circuit 36, so that the cold which is generated in the evaporator 24 is fully transferred to the heat exchanger 34. In this case, the temperature of the coolant must not be so low that frosting of the heat exchanger 34 could occur. This is the case if the power requirement of the heat exchanger 34 is extremely high and therefore the temperature of the coolant does not fall below a critical level. If the power requirement is not so high, an uncritical temperature of the coolant can be achieved by operating the primary cooling circuit 14 in a so-called "cycle/clutch" mode, with the result that the coolant in the evaporator 24 can only be cooled to a temperature which is fixed by the "cycle/clutch" mode.

Figure 3:
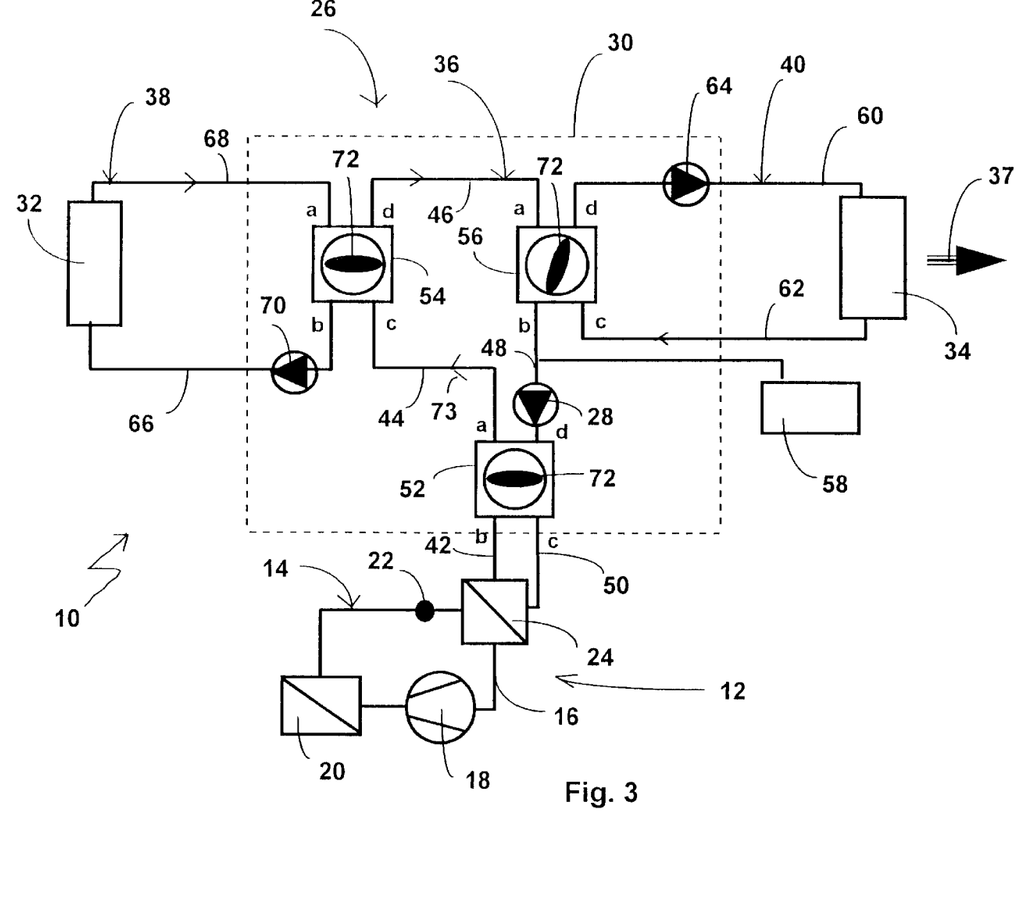

FIG. 3 illustrates an operating mode in which the cooling device according to the invention can be used as a standard air-conditioning unit. In this case, the cooling circuit is out of operation and the necessary cooling of the coolant is provided only by the cold accumulator 32, which is fully connected to the principal circuit 36 by means of a suitable positioning of the four-way valve 54. The four-way valve 52 may, as illustrated, be connected in such a manner that the ports d and a are connected to one another, so that the coolant does not flow through the evaporator 24. It is also conceivable for the four-way valve 52 to be absent altogether and for the coolant to flow through the evaporator 24 without this flow having any further function.

Via the four-way valve 56, the heat exchanger auxiliary circuit 40 can be connected to the principal circuit 36, which contains the cooled coolant. Specifically, this connection may be of greater or lesser magnitude depending on requirements. In the position of the four-way valve 56 illustrated, the ports a and b, as well as c and d, are connected to one another. Furthermore, the coolant can flow over from a to d and, in a similar manner, from c to b, the level of coolant flow that flows over being dependent on the angular position of the rotary slide 72 of the four-way valve 56, so that a fraction, the level of which can be adjusted, of the coolant flow is removed from the principal circuit 36 and can be fed to the heat exchanger auxiliary circuit. This coolant flow fraction removed from the principal circuit 36 is fed back to the principal circuit 36 when it flows over from c to b.

In this way, the required cooling capacity of the heat exchanger 34 can be adjusted up to the maximum possible cooling capacity of the cold accumulator 32. The maximum possible cooling capacity is achieved when the rotary slide 72 of the four-way valve 56 is located in a position as illustrated in FIG. 2, i.e., when the ports a and d as well as b and c are connected to one another. This controllable connection to the principal circuit 36, and therefore the possibility of adjusting the cooling capacity of the heat exchanger 34, forms an essential element of the invention.

Figure 4:
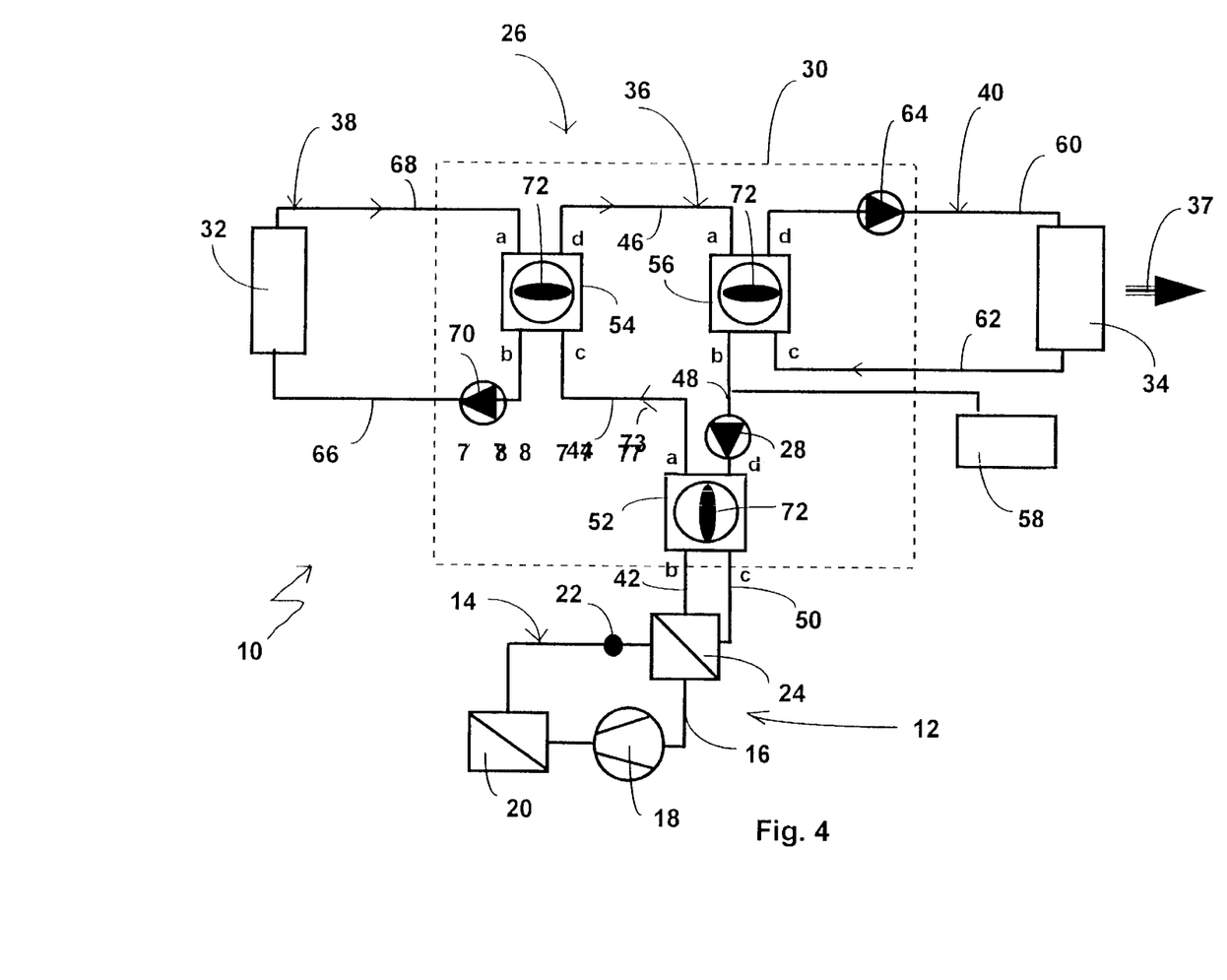

In the operating mode illustrated in FIG. 4, both the cold accumulator 32 and the heat exchanger 34 are fully connected into the principal circuit 36, and flow is also passing through the evaporator 24, so that in this operating mode, at full cooling capacity of the cooling unit 12 and with the cold accumulator 32 fully charged, it is possible for the heat exchanger 34 to provide its maximum cooling capacity, which is desirable, for example, when a vehicle which has been standing in the sun for a long time and in which the interior has heated up accordingly is to be cooled within as short a time as possible.

Figure 5A:
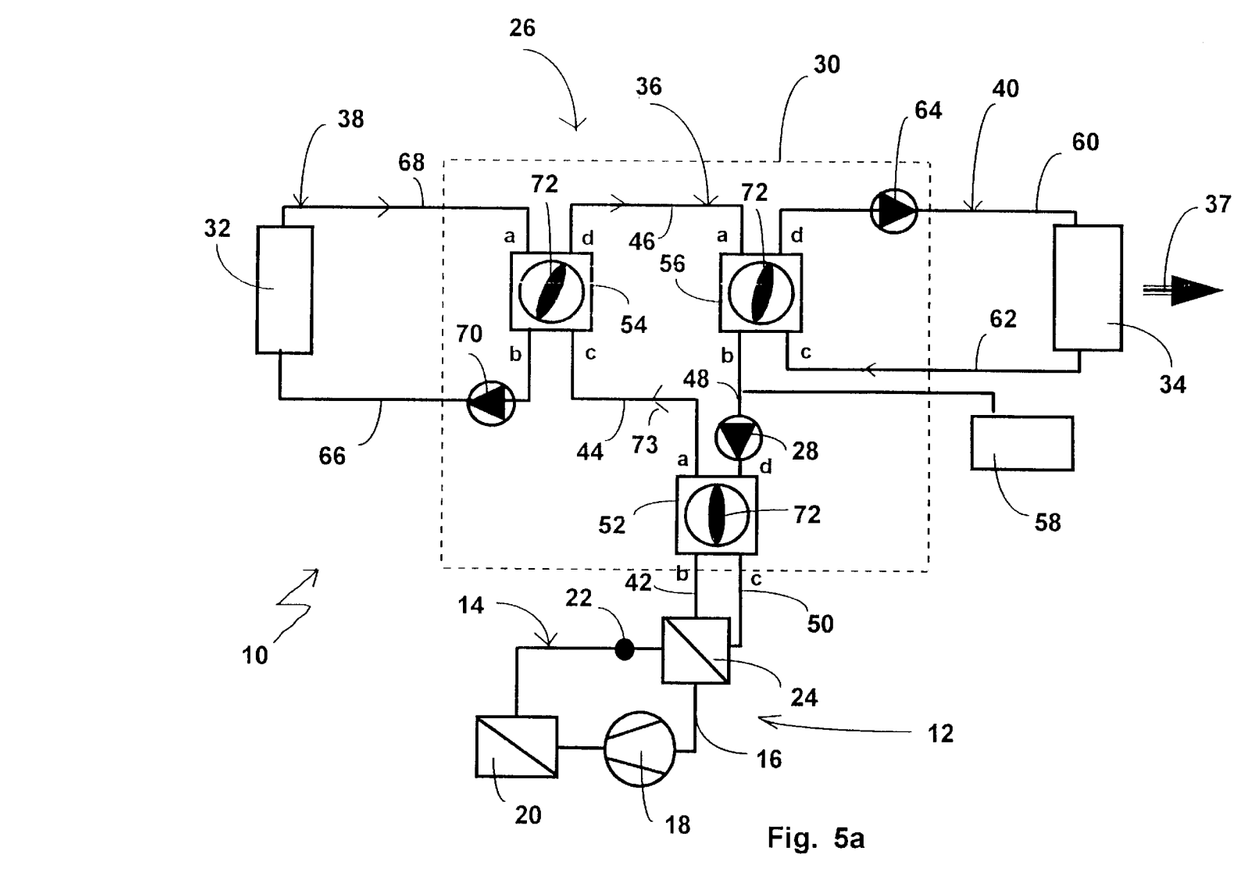

FIG. 5a shows an operating mode in which both the accumulator auxiliary circuit 38 and the heat exchanger auxiliary circuit 40 are only partially connected to the principal circuit 36, so that in each case a first fraction, the level of which can be adjusted, of the coolant flow can be fed to the cold accumulator and a second fraction, the level of which can also be adjusted, can be fed to the heat exchanger 34. This operating mode is used, for example, when, during operation of the cooling device 10, both the cold accumulator 32 is to be charged and the air for the vehicle interior is to be cooled. The cold generated in the cooling unit 12 is then distributed to the cold accumulator 32 and the heat exchanger 34 via the four-way valves 54 and 56 which have been adjusted suitably for the demand required.

Figure 5B:
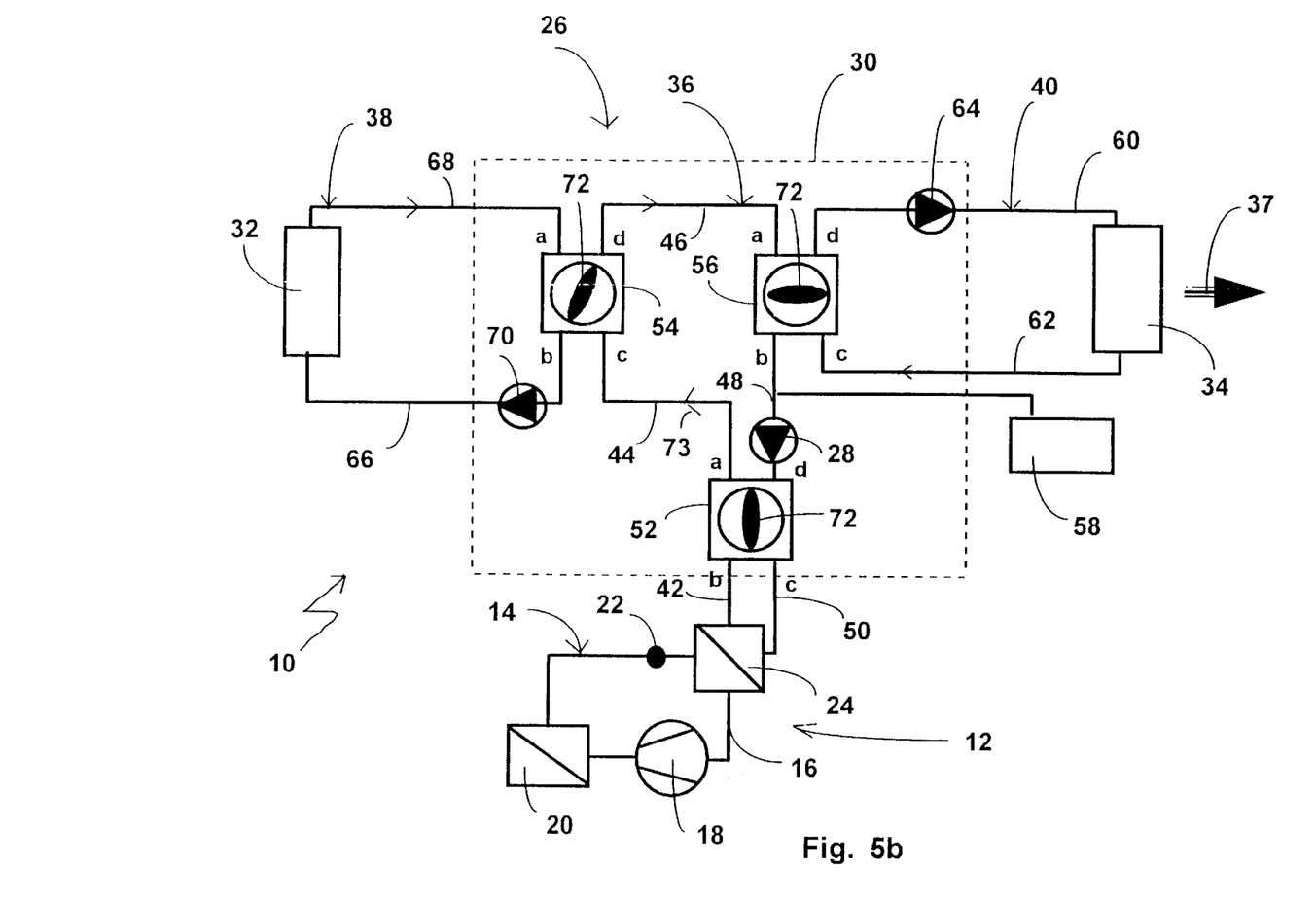
Figure 5C:
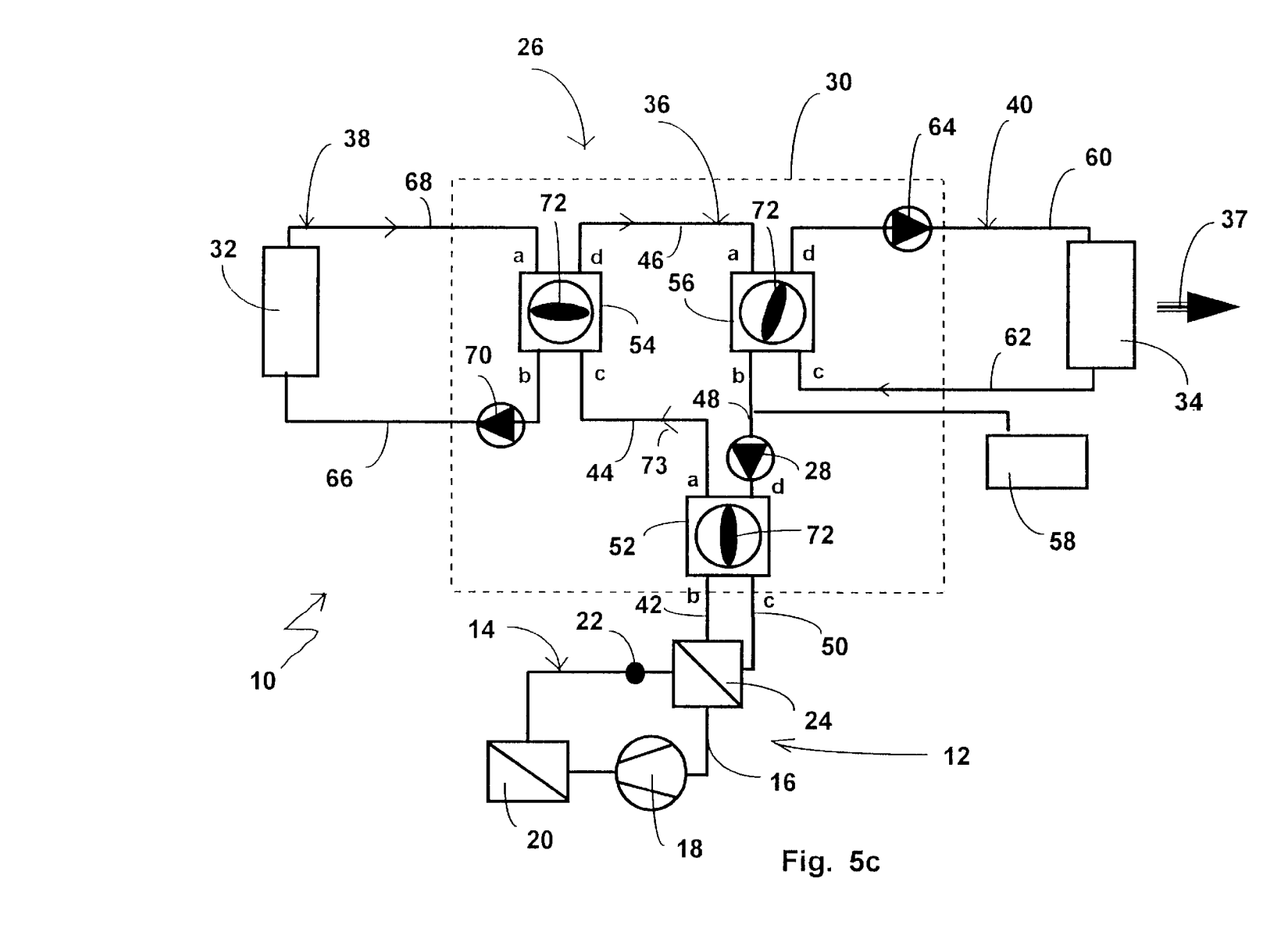

In such an operating mode, at the start of the charging operation, the heat exchanger auxiliary circuit 40 will be fully connected to the principal circuit 36, as illustrated in FIG. 5b. The ports c and b, as well as a and d, of the four-way valve 56 are then connected to one another. The extent to which the cold accumulator 32 is connected to the principal circuit 36 is defined by the four-way valve 54. The extent of connection is dependent on the temperature of the coolant, the cooling capacity required at the heat exchanger 34, and the charge state of the cold accumulator 32. During charging, the cold accumulator 32 is connected to the principal circuit 36 to an ever increasing extent, until ultimately it is fully connected to said circuit. Then, during further charging, it will be necessary to feed only some of the coolant flow to the heat exchanger 32, to ensure that there is no frosting of the heat exchanger 34. This is illustrated in FIG. 5c.

Figure 6:
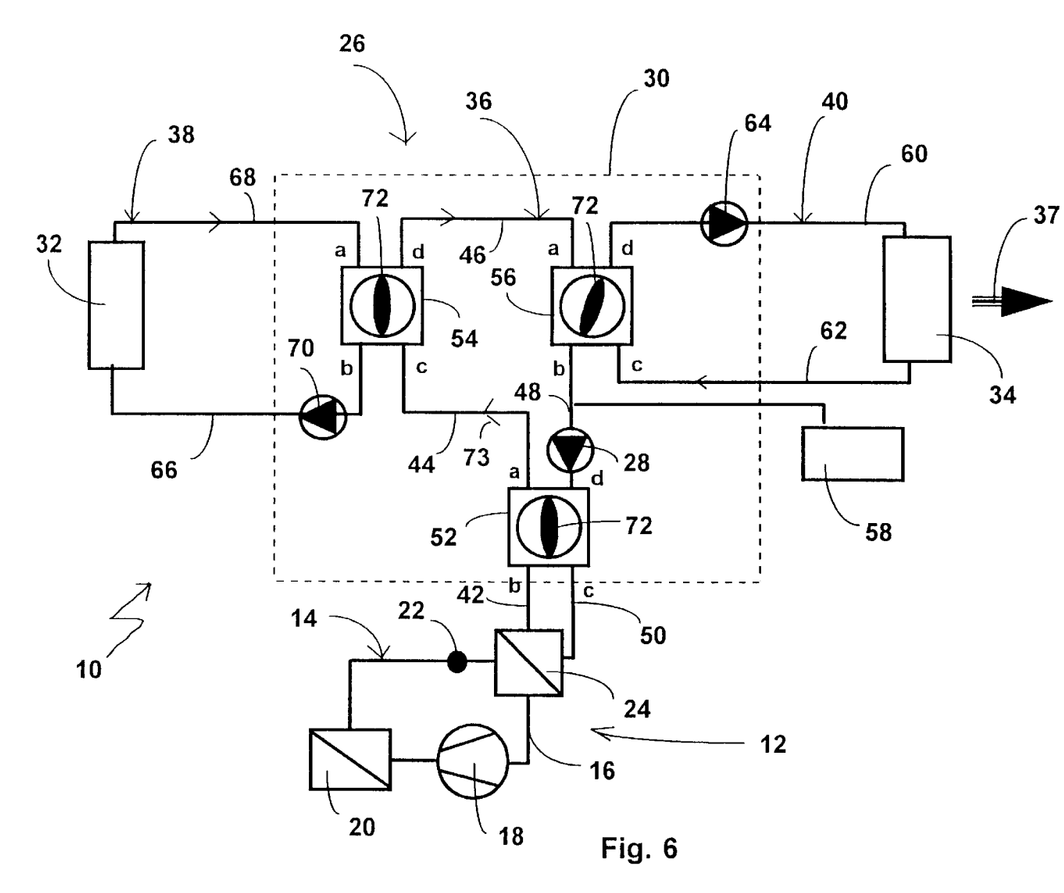

When, after charging of the cold accumulator 32, the latter is charged to its maximum extent with cold, the four-way valve 54 is moved into the position shown in FIG. 6, with the result that the accumulator auxiliary circuit 38 is fully disconnected from the principal circuit 36. The temperature of the coolant may then be well below 0° C., so that it is not possible to supply the heat exchanger 34 with the entire coolant flow, since otherwise the heat exchanger would become frosted. For this reason, the heat exchanger auxiliary circuit 40 is only partially connected to the principal circuit 36 by means of an appropriate positioning of the four-way valve 56, so that only some of the highly cooled coolant flow is branched off from the principal circuit 36 in order to act on the heat exchanger 34. Without the use of the second circulation pump 64, the extremely cold part stream of coolant which has been branched off from the principal circuit 36 would flow slowly through the heat exchanger auxiliary circuit, while being heated up in the heat exchanger 34. However, a slow flow through the heat exchanger 34 and the associated considerable heating of the coolant would result in unevenness in the air to be cooled, since the heat exchanger 34 is highly cooled on its inlet side and is at relatively high temperatures on its coolant outlet side, a state which is undesirable. With this in mind, by using the circulation pump 64, the mass flow rate is increased only in the heat exchanger auxiliary circuit, so that there can be only a slight temperature gradient of the coolant in the heat exchanger auxiliary circuit 40 and, depending on requirements, the high mass flow rate with a small temperature difference is always fed with a suitable fraction of the extremely cold coolant flow of the principal circuit 36, via the four-way valve 56. Over the course of time, an operating mode corresponding to FIG. 2 is slowly restored by increasing the coolant temperature, which is now extremely low, and by connecting the heat exchanger 34 to the principal circuit 36 to an extent which corresponds to this increase.

Figure 7:
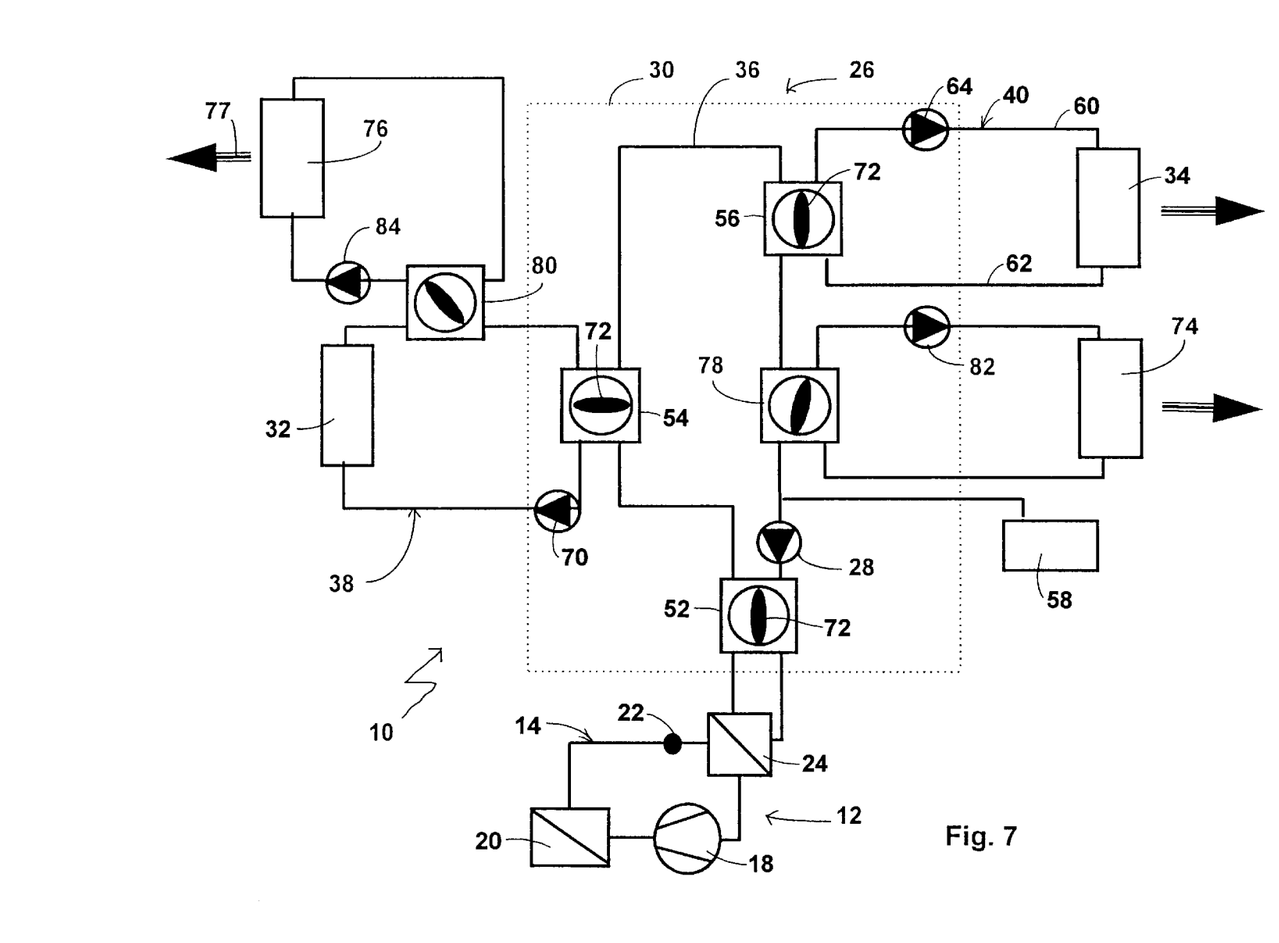
FIG. 7 shows a diagrammatic illustration of a second exemplary embodiment.

In the same way as the accumulator auxiliary circuit 38 and the heat exchanger auxiliary circuit 40 are connected to the principal circuit 36 via the four-way valves 54 and 56, further heat exchangers 74 and 76 can be connected up by means of further four-way valves 78 and 80. FIG. 7 diagrammatically depicts how the further heat exchangers 74 and 76 are connected up, the heat exchanger 74 being connected to the principal circuit 36 via the four-way valve 78, and the heat exchanger 76 being connected to the accumulator auxiliary circuit 38 via the four-way valve 80. The further heat exchanger 76 could, for example, be used to cool a cab with a bunk of a commercial vehicle and could thus be used in particular for standard air-conditioning. Preferably, the further heat exchangers 74 and 76 are each assigned further circulation pumps 82 and 84, which fulfill the same function as the second circulation pump 64.

Figure 8:
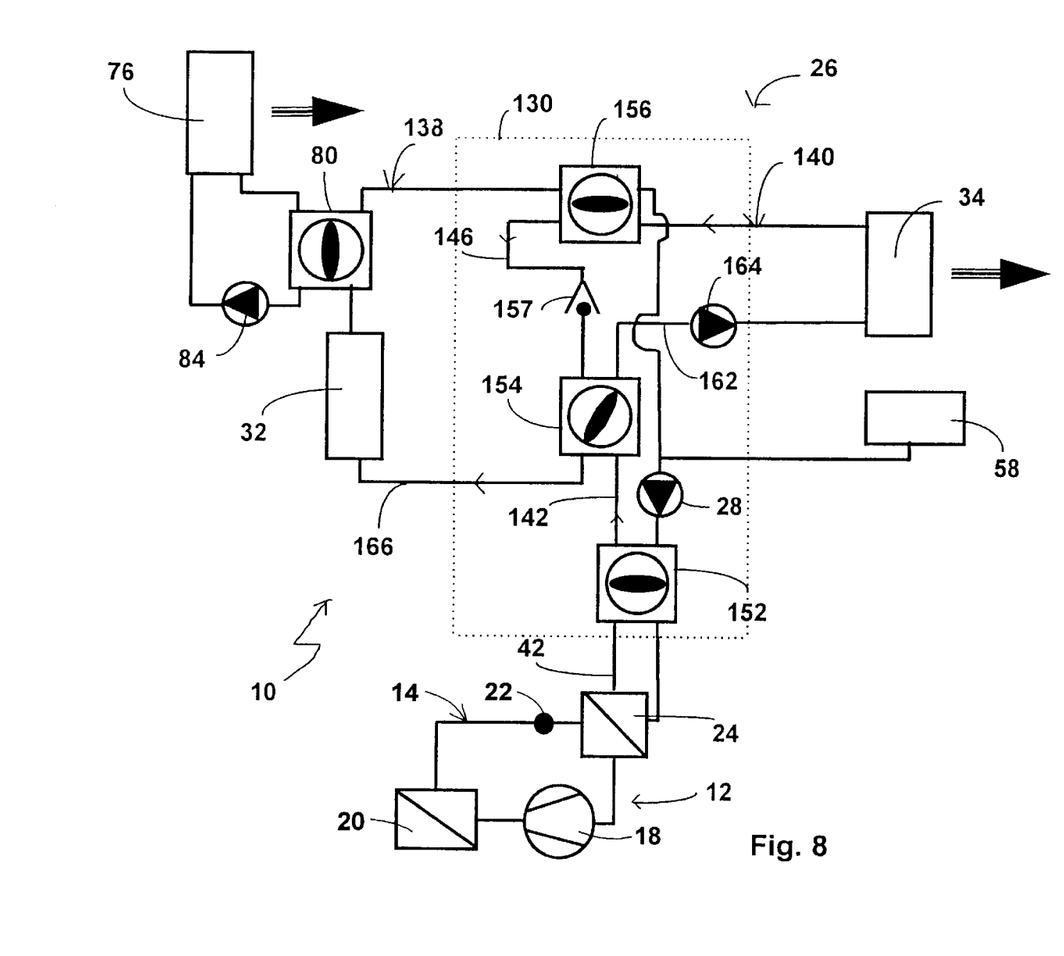
FIGS. 8 and 9 show diagrammatic illustrations of a third and fourth embodiment of the invention, respectively.

FIGS. 8 and. 9 show third and fourth embodiments of the cooling device according to the invention; an accumulator auxiliary circuit 138 or 238 and a heat exchanger auxiliary circuit 140 or 240 are also provided in each of these embodiments. Here too, a fraction, the level of which can be adjusted, of the coolant flow can be fed to both the cold accumulator 32 and the heat exchanger 34 by means of a control and distribution unit 130 or 230. However, the circuits in the control and distribution unit 130 or 230 are in this case connected to one another in a different way, with the result that the coolant flow is guided in a different way from in the first exemplary embodiment illustrated in FIGS. 1 to 6. The essential difference consists in the fact that the coolant flow fed to the control and distribution unit 130 or 230 via the coolant line 42 is in each case divided into a part stream of coolant to be fed, on the one hand, to the cold accumulator 32 and/or, on the other hand, to the heat exchanger 34.

To make the embodiment easier to understand, FIG. 8 depicts an operating state of the third exemplary embodiment which corresponds to the operating state of the cold accumulator charging and simultaneous cooling described above with regard to the first exemplary embodiment (FIGS. 5a to 5c). A four-way valve 152 has the same purpose as the four-way valve 52 from the first exemplary embodiment. The coolant flow fed to a four-way valve 154 from the evaporator 24, via the coolant line 42, the four-way valve 152 and a cooling line 142, is split into a fraction which is fed to the coolant line 166, on the one hand, and a fraction which is fed to the coolant line 162, on the other hand. In this way, on the one hand the cold accumulator 32 is charged and some of the coolant flow is applied to the heat exchanger 34. By means of the four-way valve 156, on the one hand, the part coolant from the cold accumulator 32 is guided back to the evaporator 24, and the part stream of coolant that leaves the heat exchanger 34 is likewise fed back to the evaporator 24, via the detour of the cold accumulator, a nonreturn valve 157 optionally being provided in the coolant line 146. Here too, the cold-exchanger auxiliary circuit 140 has a circulation pump 164, by means of which a high mass flow rate can be maintained in the cold-exchanger auxiliary circuit 140 independently of the mass flow rate in the rest of the circuit.

By means of suitable positions of the four-way valves 152, 154 and 156, it is possible to set the same operating states as those explained in detail for the first exemplary embodiment with reference to FIGS. 1–6.

Figure 9:
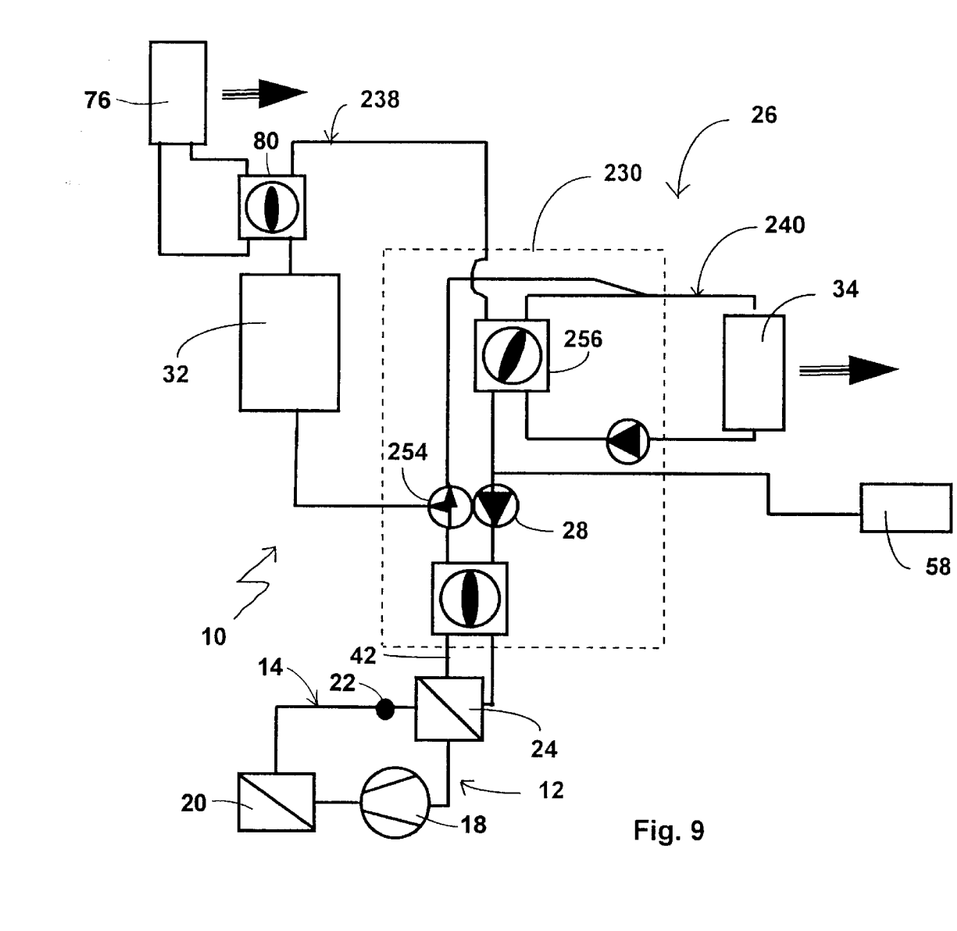

A cooling device according to a fourth exemplary embodiment, as illustrated in FIG. 9, also operates in entirely the same way as the third exemplary embodiment shown in FIG. 8. The essential difference from the third embodiment consists in the fact that the four-way valve 154 from FIG. 8 has been replaced by a three-way valve 254. Suitable positions of the valves of the control and distribution unit 230 again allow the same operating states as those which have already been described above in connection with the first exemplary embodiment to be achieved.

As explained above, the secondary circuit of the present cooling device has a control and distribution unit, by means of which a first fraction, the level of which can be adjusted, of the coolant flow can be fed to the cold accumulator, and a second fraction, the level of which can also be adjusted, can be fed to the heat exchanger. If only a fraction of the coolant flow is fed to both the cold accumulator and the heat exchanger, the flow temperatures at the coolant/air heat exchanger for cooling the air to be supplied to the vehicle interior, even at coolant temperatures of well below 0° C., as are required to charge the cold accumulator, can be set in such a way to eliminate the risk of the heat exchanger becoming frosted. The cooling capacity can then be distributed to the cold accumulator and the heat exchanger as desired.

Even when the cold accumulator is being discharged, for example for standard air-conditioning, the cooling device according to the invention has the advantage that it is possible to feed only a fraction, the level of which can be adjusted, of the coolant circulating in the secondary circuit to the heat exchanger, so that when, for example, the full cooling capacity of the cold accumulator is not required during standard air-conditioning, it is not necessary for the full cooling capacity to be transferred to the heat exchanger, which is the only possibility in the cooling device known from DE 43 27 866. The cooling capacity of the heat exchanger can therefore be adjusted largely independently of the amount of air which flows through the heat exchanger.

Further advantages are that the heat exchanger can be designed specifically to cool the air and that optimum transfer capacities can be achieved. By contrast, the heat exchanger which is known from DE 43 27 866 cannot be optimally adapted, since it is used both to cool and to heat the air, and these two requirements cannot be optimally fulfilled in one heat exchanger.

Preferably, the secondary circuit has a principal circuit, in which the coolant circulates through a circulation pump. If necessary, the first and second fractions of the coolant flow for the cold accumulator and the heat exchanger can be branched off from this principal circuit, for which purpose suitable means are provided in the control and distribution unit.

The secondary circuit advantageously also has an accumulator auxiliary circuit, to which the first fraction of the coolant flow can be fed, in order to charge and discharge the cold accumulator, as well as a heat exchanger auxiliary circuit, to which the second fraction of the coolant flow can be fed, in order for the coolant to act on the heat exchanger. This design provides a simple means of transferring the cold which is generated in the evaporator of the primary circuit to the cold accumulator and the heat exchanger and of feeding the cold which is stored in the cold accumulator into the principal circuit and, if necessary, to connect the cold into the heat exchanger auxiliary circuit.

If the control and distribution unit has a second circulation pump arranged in the heat exchanger auxiliary circuit, this pump can be used to maintain a minimum mass flow rate in the heat exchanger auxiliary circuit, thus ensuring a high mass flow rate through the heat exchanger, making it possible to control the high mass flow rate independently of the coolant mass flow rate in the principal circuit. As a result, it is possible to provide relatively slight heating of the coolant in this auxiliary circuit. The coolant, which circulates in the heat exchanger auxiliary circuit, then exhibits little warming in the heat exchanger, making it possible to achieve a uniform temperature distribution of the air cooled by the heat exchanger across the cross section of the heat exchanger. As a result, there is no so-called "unevenness" of the conditioned air, and the comfort for passengers inside the vehicle interior is increased.

To ensure that the coolant does not flow through the cold accumulator, for example, when it is fully charged, and through the heat exchanger when it is not in use, the accumulator auxiliary circuit and the heat exchanger auxiliary circuit can be disconnected from the principal circuit, preferably by means of four-way valves of the control and distribution unit.

On the other hand, suitable actuation of the four-way valves allows the auxiliary circuits to be connected to the principal circuit again when required and, depending on the position of the four-way valves, in each case only a fraction of the coolant flow circulating in the principal circuit flows into the corresponding auxiliary circuit and/or vice versa.

In a simple configuration of the invention, the accumulator auxiliary circuit and/or the heat exchanger auxiliary circuit is connected to the principal circuit by means of only one four-way valve, so that both an inlet and an outlet of the auxiliary circuit are connected to the same four-way valve. In this way, by actuating only one four-way valve, it is possible to adjust the extent of connection between the corresponding auxiliary circuit and the principal circuit, specifically in the range from complete disconnection of the auxiliary circuit from the principal circuit through to complete connection, in which state the entire coolant flow of the principal circuit also flows through the auxiliary circuit.

A further particular advantage of the invention consists in the fact that further heat exchangers and/or means for cooling surfaces or components and/or further cold consumer units, such as, for example, a refrigerator and/or further cold accumulators, can be connected to the principal circuit and/or to one of the auxiliary circuits by means of the control and distribution unit, and thus the cooling device according to the invention can be used in a wide variety of ways. For example, a further heat exchanger for the separate air-conditioning of a cab with a bunk could be provided in commercial vehicles.

In order to ensure that there is no need for flow through the evaporator of the primary cooling circuit when the device according to the invention is being operated as a standard air-conditioning unit, i.e., when the cooling unit is switched off, in a refinement of the invention a bypass is provided in parallel with the evaporator.

DE 198 38 880.2, filed Aug. 27, 1998, is hereby incorporated by reference in its entirety.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A cooling device for a motor vehicle, comprising:
   a cold accumulator;
   a heat exchanger;
   a primary cooling circuit having an evaporator; and
   a secondary circuit for transferring, via a coolant, cold generated in the evaporator of the primary cooling circuit to the cold accumulator and the heat exchanger to cool air fed to a vehicle interior, the secondary circuit feeding a first fraction of coolant flow to the cold accumulator and a second fraction of coolant flow to the heat exchanger, the first fraction and the second fraction being selectively adjustable, the secondary circuit including
   a control and distribution unit having a principal circuit and a circulation pump for conveying coolant in the principal circuit,
   an accumulator auxiliary circuit for selective communication of coolant to and from the control and distribution unit in accordance with the first fraction, the accumulator auxiliary circuit comprising the cold accumulator and coolant lines, connected to the cold accumulator, through which the first fraction of the coolant flows to charge and discharge the cold accumulator, and
   a heat exchanger auxiliary circuit for selective communication of coolant to and from the control and distribution unit in accordance with the second fraction, the heat exchanger auxiliary circuit comprising the heat exchanger and coolant lines, connected to the heat exchanger, through which the second fraction of the coolant flows; and
   a second circulation pump, fluidly communicating with a coolant line of the heat exchanger auxiliary circuit, the second circulation pump being adapted to maintain a minimum mass flow rate of the coolant in the heat exchanger auxiliary circuit, the minimum mass flow rate being independent of coolant flow of the principal circuit.

2. The cooling device as claimed in claim 1, wherein the control and distribution unit selectively disconnects the accumulator auxiliary circuit and the heat exchanger auxiliary circuit from the principal circuit.

3. The cooling device as claimed in claim 1, wherein the control and distribution unit includes a plurality of four-way valves to control the selective communication between the accumulator auxiliary circuit and the control and distribution unit and between the heat exchanger auxiliary circuit and the control and distribution unit.

4. The cooling device as claimed in claim 3, wherein one of the four-way valves includes both an inlet port to and an outlet port from the accumulator auxiliary circuit, and an other of the four-way valves includes both an inlet port to and an outlet port from the heat exchanger auxiliary circuit.

5. The cooling device as claimed in claim 1, further comprising a second heat exchanger for selective fluid communication with at least one of the principal circuit, the accumulator auxiliary circuit, and the heat exchanger auxiliary circuit via a four-way valve.

6. The cooling device as claimed in claim 1, further comprising a second cold accumulator for selective fluid communication with at least one of the principal circuit, the accumulator circuit, and the heat exchanger auxiliary circuit via a four-way valve.

7. The cooling device as claimed in claim 1, further comprising a bypass in parallel with the evaporator.

8. The cooling device as claimed in claim 1, wherein the heat exchanger is part of an air-conditioning unit of the motor vehicle.

* * * * *